US012681439B2

(12) United States Patent
Goyet

(10) Patent No.: US 12,681,439 B2
(45) Date of Patent: Jul. 14, 2026

(54) WATCH DIAL WITH BALLS

(71) Applicant: The Swatch Group Research and Development Ltd, Marin (CH)

(72) Inventor: Damien Goyet, Winkel (FR)

(73) Assignee: The Swatch Group Research and Development Ltd, Marin (CH)

( * ) Notice: Subject to any disclaimer, the term of this patent is extended or adjusted under 35 U.S.C. 154(b) by 884 days.

(21) Appl. No.: 17/770,425

(22) PCT Filed: Nov. 5, 2020

(86) PCT No.: PCT/EP2020/081092
§ 371 (c)(1),
(2) Date: Apr. 20, 2022

(87) PCT Pub. No.: WO2021/089681
PCT Pub. Date: May 14, 2021

(65) Prior Publication Data

US 2022/0390899 A1 Dec. 8, 2022

(30) Foreign Application Priority Data

Nov. 5, 2019 (EP) .................................... 19207240

(51) Int. Cl.
*G04B 39/00* (2006.01)
*G04B 19/04* (2006.01)

(52) U.S. Cl.
CPC ........... *G04B 39/002* (2013.01); *G04B 19/04* (2013.01)

(58) Field of Classification Search
None
See application file for complete search history.

(56) References Cited

U.S. PATENT DOCUMENTS 4,553,851 A 11/1985 Matsumoto et al.

FOREIGN PATENT DOCUMENTS

| | | | | |
|---|---|---|---|---|
| CH | 309970 | A | | 9/1955 |
| CH | 336334 | A | | 2/1959 |
| CN | 202421752 | U | * | 9/2012 |
| CN | 106094493 | A | | 11/2016 |
| DE | 84 34 517 | U1 | | 4/1985 |
| JP | 57-12381 | A | | 1/1982 |

OTHER PUBLICATIONS

Translation of CH309970, Espacenet (Year: 1955).*
Translation of CN202421752, Espacenet (Year: 2012).*
International Search Report for PCT/EP2020/081092 dated Jan. 22, 2021.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

Provided is a watch glass configured to be disposed on a watch dial with indications. This watch dial comprises at least one indication, a first chamber configured to let a first mobile element circulate, a second chamber configured to comprise a second mobile element and a separation wall separating the chambers and large enough to obtain from the indications of the dial an enlarged image.

7 Claims, 1 Drawing Sheet

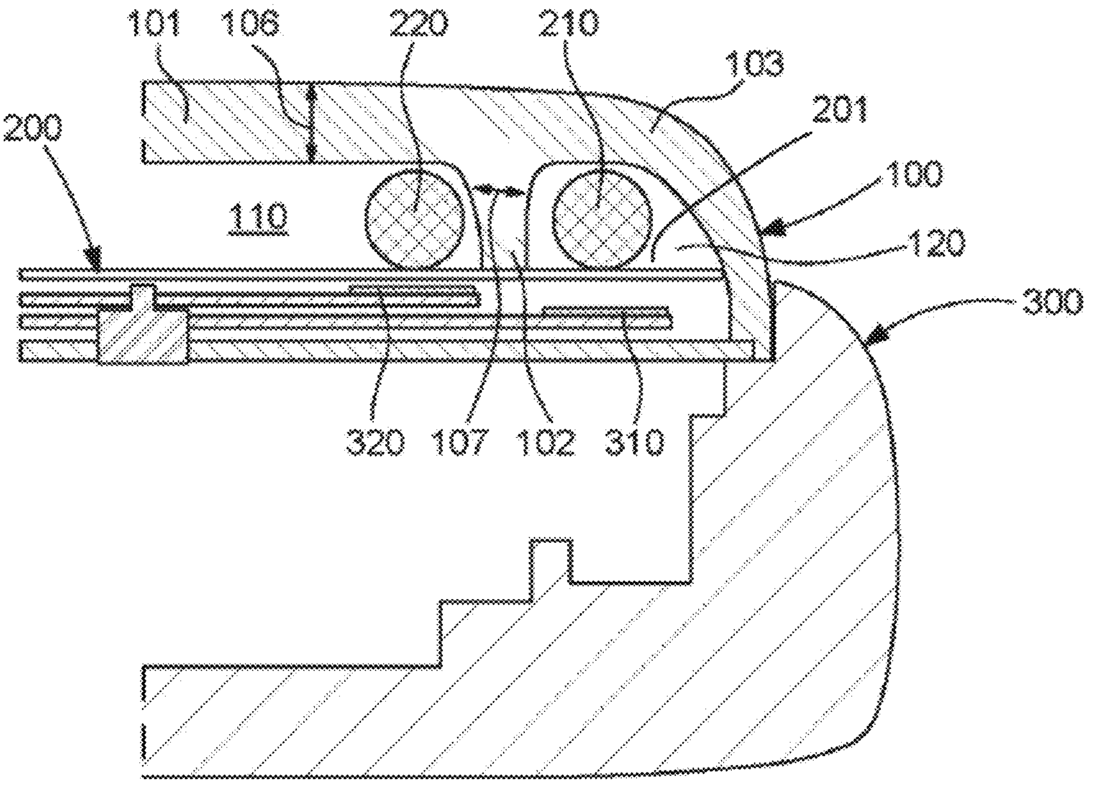
101
106
220
210
103
201
200
110
100
120
300
320
107
102
310

WATCH DIAL WITH BALLS

CROSS REFERENCE TO RELATED APPLICATIONS

This application is a National Stage of International Application No. PCT/EP2020/081092 filed Nov. 5, 2020, claiming priority based on European Patent Application No. 19207240.3 filed Nov. 5, 2019.

TECHNICAL FIELD

The present invention relates to the field of watch glasses and more precisely the watch glasses comprising an eyeglass and resistant to shocks.

TECHNOLOGICAL BACKGROUND

Dials comprising balls are known from the prior art. However, these balls can move freely on the dial and unfortunately during sports activities, these balls can hit the watch glass and thus damage it, which negatively affects the appearance of the watch on the one hand and degrades the readability of the indications of the dial.

SUMMARY OF THE INVENTION

The present invention intends to totally or partly resolve these disadvantages thanks to a watch glass configured to be disposed on a watch and in particular on a watch dial; said watch dial comprising at least one indication; said watch glass comprising at least one first chamber configured to comprise a first mobile element; said at least one first chamber comprising at least one upper wall configured to be distant, and at least one lateral wall being thicker than said at least one upper wall;

characterised in that said at least one upper wall and said at least one lateral wall are configured to form said at least one first chamber.

Thanks to this arrangement, said at least one first mobile element is confined in a limited space, which limits its movement and avoids said at least one first mobile element hitting a location of the watch glass on the one hand and on the other hand, and the shock of said at least one first mobile element on the watch glass being too great. Thus, said at least one first mobile element can hit the watch glass without damaging the glass and without negatively affecting the appearance of the watch and thus degrading the readability of the indications of the dial.

According to one embodiment, said watch glass comprises at least one second chamber configured to comprise at least one second mobile element and at least one peripheral wall being configured to form said at least one second chamber.

Thanks to this arrangement,

According to one embodiment, said at least one second chamber surrounds said at least one lateral wall and/or said at least one first chamber.

According to one embodiment, said at least one peripheral wall surrounds said at least one lateral wall and/or said at least one second chamber.

Thanks to one or the other of these preceding arrangements, said at least one second mobile element is confined in a space comprised between said at least one lateral wall and said at least one peripheral wall.

According to one embodiment, said at least one lateral wall is configured to obtain from said at least one indication an enlarged image.

Thanks to this arrangement, said at least one separation wall has an eyeglass effect.

The present invention also relates to a watch dial comprising a watch glass according to any one of the previous claims, at least one first mobile element configured to move freely in said at least one first chamber and at least one second mobile element configured to move freely in said at least one second chamber.

Thanks to this arrangement, the balls are confined in a limited space, which limits their movements and avoids these balls simultaneously hitting a location of the watch glass on the one hand and on the other hand, and the shock of one of the balls on the watch glass being too great. Thus, these balls can hit the watch glass without damaging the glass and without negatively affecting the appearance of the watch and thus degrading the readability of the indications of the dial.

According to one embodiment, said at least one first mobile element and/or said at least one second mobile element is or are made from ferromagnetic material.

Thanks to this arrangement, said at least one first mobile element and/or said at least one second mobile element can be magnetised.

The present invention also relates to a watch comprising a watch dial according to the previous claim, at least one first magnetised hand located under the watch dial and configured to move said at least one first mobile element through said watch dial and at least one second magnetised hand located under the watch dial and configured to move said at least one second mobile element through said watch dial.

Thanks to this arrangement, the balls are moved in a limited space thanks to magnetised hands so as to indicate a piece of information, which limits their movements and avoids the balls simultaneously hitting a location of the watch glass on the one hand and on the other hand, and the shock of one of the balls on the watch glass being too great. Thus, these balls can hit the watch glass without damaging the glass and without negatively affecting the appearance of the watch and thus degrading the readability of the indications of the dial.

The embodiments and alternatives mentioned above can be taken alone or according to any technically possible combination.

The present invention will be well understood and its advantages will also be clear in the light of the following description, given only as a non-limiting example and made in reference to the appended drawings, in which identical reference signs correspond to structurally and/or functionally identical or similar elements.

BRIEF DESCRIPTION OF THE DRAWING

The invention will be described below in a more detailed manner using the appended drawing, given as an example that is in no way limiting, in which the only drawing shows a watch comprising a dial and a watch glass according to one embodiment.

DETAILED DESCRIPTION OF THE INVENTION

The only drawing shows an embodiment of the present invention in the form of a watch glass 100 disposed on a watch 300 and more particularly on a watch dial 200 comprising at least one indication 201 for example such as the hour or the minute.

Said watch glass 100 of the present invention comprises at least one first chamber 110 in which at least one first mobile element 210, typically a ball and preferably made of ferromagnetic material, can move freely.

"Move freely" should be understood as there not existing any obstacle to the movement of said at least one first mobile element 210. Indeed, said at least one first chamber 110 is comprised between said watch dial 200 with at least one indication 201 and at least one upper wall 101 distant from said watch dial 200, that is to say that they are separated by a space, and at least one lateral wall.

Said at least one lateral wall 102 is comprised between said at least one upper wall 101 and said watch dial 200 on the one hand, and on the other hand said at least one lateral wall 102 surrounds said at least one first chamber 110, as shown in the only drawing, so that said at least one upper wall 101 and said at least one lateral wall 102 form said at least one first chamber 110.

As visible in the only drawing, said at least one lateral wall 102 is thicker than said at least one upper wall 101. Indeed, the thickness of said at least one upper wall 106 is smaller than the thickness of said at least one lateral wall 107.

Thus, the ball 210 or the balls are confined, in other words said at least one first mobile element 210 is confined in a limited space, that is to say that of said at least one first chamber 110, which limits its movement and avoids said at least one first mobile element 210 hitting a location of the watch glass 100 on the one hand and on the other hand, and the shock of said at least one first mobile element 210 on the watch glass 100 being too great.

Thus, these balls can hit the watch glass 100 without damaging the glass, since the thickness of said at least one lateral wall 107 is large enough to dissipate the energy of the shock of said at least one first mobile element 210, and this does not negatively affect the appearance of the watch and thus cannot degrade the readability of the indications 201 of the dial.

It is also possible to provide another indication on said watch dial and to do this said watch glass 100 can comprise at least one second chamber 120 configured to comprise at least one second mobile element 220, typically a ball and preferably made of ferromagnetic material, and at least one peripheral wall 103 configured to form said at least one second chamber 120.

Said at least one peripheral wall 103 also comprises a thickness, but since said at least one peripheral wall 103 forms said at least one second chamber 120 and the latter, that is to say said at least one second chamber 120, surrounds said at least one lateral wall 102 and/or said at least one first chamber 110 and consequently said at least one peripheral wall 103 surrounds said at least one lateral wall 102 and/or said at least one second chamber 120, so that said at least one second mobile element 220 is relatively limited in its movements in comparison to said at least one first mobile element 210, since said at least one second mobile element 220 is confined in a space comprised between said at least one lateral wall 102 and said at least one peripheral wall 103.

Of course, according to the geometry that said watch dial 200 can have, the most obvious shape for said at least one peripheral wall 103 is the circular shape since it allows to easily deviate the trajectory of said at least one second mobile element 220, but when said watch dial 200 comprises straight lines, it is natural to dispose said at least one lateral wall 102 outside of said watch 300 in order to avoid said at least one first mobile element 210 from inflicting too an impact on the watch glass 200 due to the length of its trajectory.

Another advantage that can be drawn from the thickness of said at least one lateral wall 107 is the eyeglass effect since being thicker than said at least one upper wall 101, the thickness of said at least one lateral wall 107 allows to obtain from said at least one indication 201 an enlarged image. In other words, said at least one separation wall 102 has an eyeglass effect.

These various embodiments can be implemented in a watch 300 comprising a watch dial 200, as described above.

Said watch 300 comprises at least one first magnetised hand 310 located under the watch dial 200 so as to move said at least one first mobile element 210 made of ferromagnetic material through said watch dial 200 and at least one second magnetised hand 320 also located under the watch dial 200 and also being able to move said at least one second mobile element 220 made of ferromagnetic material through said watch dial 200. Thus, the balls are moved in a limited space thanks to the magnetised hands so as to indicate a piece of information, for example such as the hour or the minutes, which limits their movements and avoids the balls simultaneously hitting a location of the watch glass 100 on the one hand and on the other hand, and the shock of one of the balls on the watch glass 100 being too great. Thus, these balls can hit the watch glass 100 without damaging the glass and without negatively affecting the appearance of the watch and thus degrading the readability of the indications 201 of the dial.

The invention claimed is:

1. A watch glass (100) configured to be disposed on a watch dial (200) of a watch; said watch dial (200) comprising at least one indication (201); said watch glass (100) comprising at least one first chamber (110) configured to comprise a first mobile element (210); said at least one first chamber (110) comprising at least one upper wall (101) configured to be distant, and at least a portion of at least one lateral wall (102) being thicker than said at least one upper wall (101);

wherein said at least one upper wall (101) and said at least one lateral wall (102) are configured to form said at least one first chamber (110), and in that said watch glass comprises at least one second chamber (120) configured to comprise a second mobile element (220) and at least one peripheral wall (103) being configured to form said at least one second chamber (120), and a movement of said second mobile element is more restricted than the movement of said first mobile element.

2. The watch glass (100) according to claim 1, wherein said at least one second chamber (120) surrounds said at least one lateral wall (102) and/or said at least one first chamber (110).

3. The watch glass (100) according to claim 1, wherein said at least one peripheral wall (103) surrounds said at least one lateral wall (102) and/or said at least one second chamber (120).

4. The watch glass (100) according to claim 1, wherein said at least one lateral wall (102) is configured to obtain from said at least one indication (201) an enlarged image.

5. A watch dial (200) comprising a watch glass (100) configured to be disposed on a watch; said watch dial (200) comprising at least one indication (201); said watch glass (100) comprising at least one first chamber (110) configured to comprise a first mobile element (210); said at least one first chamber (110) comprising at least one upper wall (101) configured to be distant, and at least a portion of at least one lateral wall (102) being thicker than said at least one upper wall (101), wherein said at least one upper wall (101) and said at least one lateral wall (102) are configured to form said at least one first chamber (110), and in that said watch glass comprises at least one second chamber (120) configured to comprise a second mobile element (220) and at least one peripheral wall (103) being configured to form said at least one second chamber (120), wherein at least one first mobile element (210) is configured to move freely in said at least one first chamber (110) and at least one second mobile element (220) is configured to move freely in said at least one second chamber (120), and wherein a movement of said at least one second mobile element is more restricted than the movement of said at least one first mobile element.

6. The watch dial (200) according to claim 5, wherein said at least one first mobile element (210) and/or said at least one second mobile element (220) is or are made from ferromagnetic material.

7. A watch (300) comprising: a watch dial (200) and a watch glass (100) configured to be disposed on said watch dial (200); said watch dial (200) comprising at least one indication (201); said watch glass (100) comprising at least one first chamber (110) configured to comprise a first mobile element (210); said at least one first chamber (110) comprising at least one upper wall (101) configured to be distant, and at least a portion of at least one lateral wall (102) being thicker than said at least one upper wall (101), wherein said at least one upper wall (101) and said at least one lateral wall (102) are configured to form said at least one first chamber (110), and in that said watch glass comprises at least one second chamber (120) configured to comprise a second mobile element (220) and at least one peripheral wall (103) being configured to form said at least one second chamber (120), at least one first mobile element (210) configured to move freely in said at least one first chamber (110) and at least one second mobile element (220) configured to move freely in said at least one second chamber (120), wherein at least one first magnetised hand (310) located under the watch dial (200) and configured to move said at least one first mobile element (210) through said watch dial (200) and at least one second magnetised hand (320) located under the watch dial (200) and configured to move said at least one second mobile element (220) through said watch dial (200), and wherein a movement of said at least one second mobile element is more restricted than the movement of said at least one first mobile element.

* * * * *